(12) United States Patent
Palin et al.

(10) Patent No.: US 8,091,862 B2
(45) Date of Patent: Jan. 10, 2012

(54) BUTTERFLY VALVES HAVING SLEEVE INSERTS

(75) Inventors: Harold J. Palin, Monroe, CT (US); Lawrence N. Secchiaroli, Stratford, CT (US); John C. Luckachina, Shelton, CT (US); Alexander Vygoder, Naugatuck, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 994 days.

(21) Appl. No.: 11/536,696

(22) Filed: Sep. 29, 2006

(65) Prior Publication Data

US 2008/0078972 A1    Apr. 3, 2008

(51) Int. Cl.
*F16K 1/22* (2006.01)
(52) U.S. Cl. .................. 251/298; 251/306; 251/368
(58) Field of Classification Search .................. 251/298, 251/305–308, 368
See application file for complete search history.

(56) References Cited

U.S. PATENT DOCUMENTS

| | | | | |
|---|---|---|---|---|
| 3,502,299 A | * | 3/1970 | Phillips | 251/306 |
| 3,640,499 A | * | 2/1972 | Jung | 251/305 |
| 4,025,050 A | * | 5/1977 | Manki et al. | 251/306 |
| 4,259,980 A | * | 4/1981 | Muller | 251/306 |
| 4,667,883 A | * | 5/1987 | Fink, Jr. | 251/306 |
| 5,531,205 A | * | 7/1996 | Cook et al. | 251/306 |
| 5,664,760 A | * | 9/1997 | Army et al. | 251/305 |
| 5,876,015 A | * | 3/1999 | Schaeffer et al. | 251/305 |
| 5,979,053 A | | 11/1999 | Schaeffer et al. | |
| 6,138,988 A | * | 10/2000 | Bouvet et al. | 251/306 |
| 6,427,975 B1 | * | 8/2002 | Powell | 251/305 |
| 6,505,643 B2 | * | 1/2003 | Scholten et al. | 251/305 |
| 6,684,898 B2 | | 2/2004 | Wiggins et al. | |
| 6,694,746 B2 | | 2/2004 | Reed et al. | |
| 6,722,137 B2 | * | 4/2004 | Proctor et al. | 251/305 |
| 6,761,348 B2 | * | 7/2004 | Michels et al. | 251/305 |
| 7,055,800 B2 | * | 6/2006 | Nakamura | 251/305 |
| 7,066,710 B2 | | 6/2006 | Wiggins et al. | |
| 7,077,383 B1 | * | 7/2006 | Dreisilker et al. | 251/305 |
| 2005/0183705 A1 | * | 8/2005 | Nanba et al. | 251/305 |

FOREIGN PATENT DOCUMENTS

| | | |
|---|---|---|
| EP | 0270727 | 6/1988 |
| EP | 1705409 | 9/2006 |
| GB | 732184 | 6/1955 |

OTHER PUBLICATIONS

PCT International Search Report and written opinion mailed Sep. 9, 2008.

* cited by examiner

*Primary Examiner* — John Bastianelli
(74) *Attorney, Agent, or Firm* — Carlson Gaskey & Olds, P.C.

(57) ABSTRACT

A butterfly valve having a valve body, a butterfly shaft, a butterfly plate, and a sleeve insert is provided. The valve body is made of a first material and the sleeve insert is made of a second material. The butterfly shaft is in the valve body for rotation about a first axis. The butterfly plate is in the valve body and secured to the butterfly shaft so that rotation of the butterfly shaft causes the butterfly plate to rotate about a second axis through a travel path between a closed position and an open position. The sleeve insert is in the valve body at least in a region of the travel path between the valve body and the butterfly plate.

18 Claims, 1 Drawing Sheet

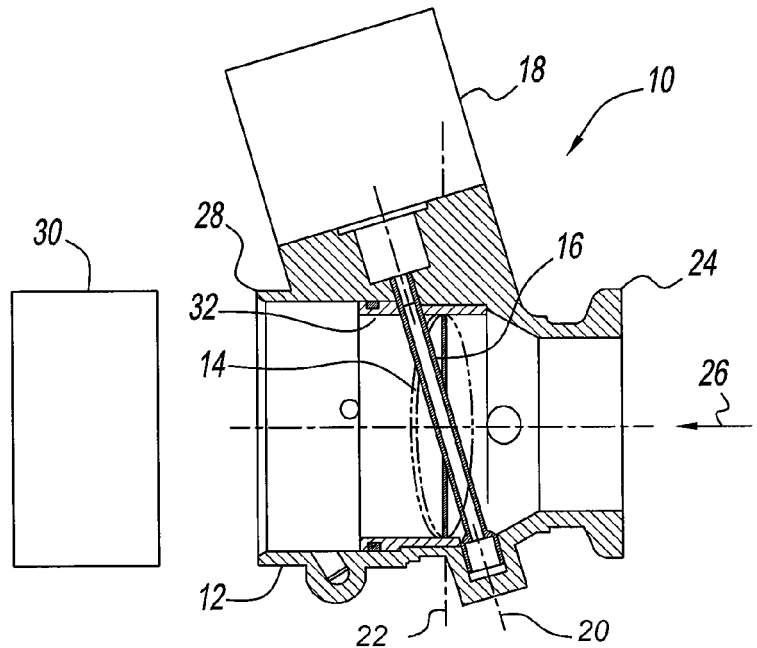
Fig. 1
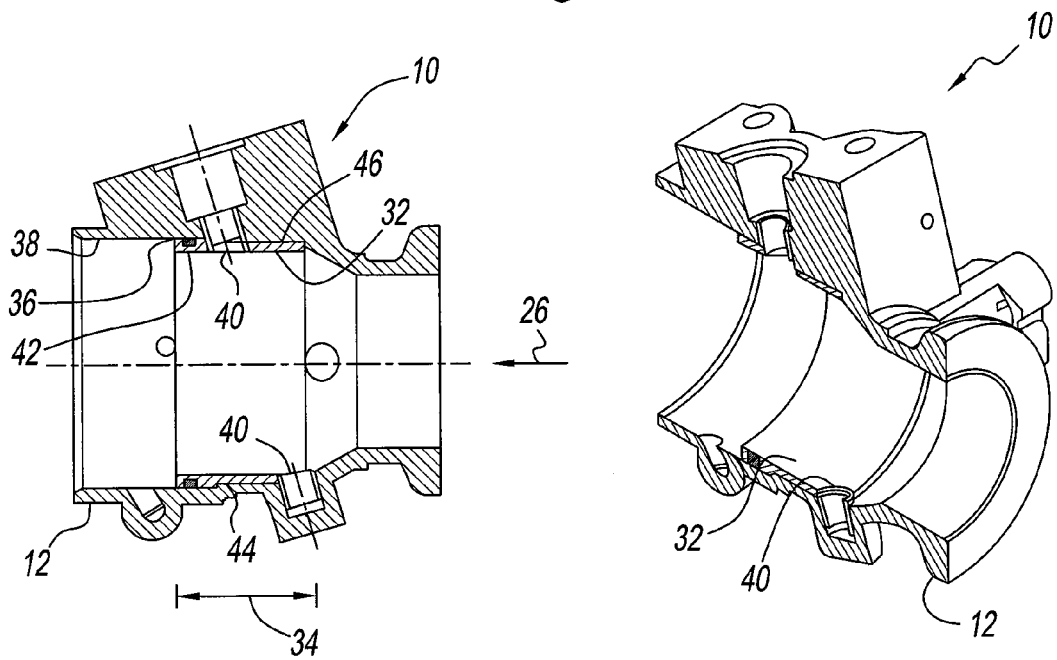
Fig. 2
Fig. 3

BUTTERFLY VALVES HAVING SLEEVE INSERTS

BACKGROUND OF THE INVENTION

1. Field of the Invention

The present disclosure is related to butterfly valves for aircraft. More particularly, the present disclosure is related to butterfly valves having sleeve inserts.

2. Description of Related Art

In many aircraft, such as those using turbine engines, it is common to use butterfly valves for selectively controlling the flow of high-pressure air to various aircraft systems such as, but not limited to, starting systems, anti-icing systems, electrical generation systems, auxiliary power units (APU's), environmental control systems, and others.

In the use of butterfly valves with starting systems, the high-pressure valve is commonly known as a "starter valve". The starter valve is used to selectively control the flow of high-pressure fluid to an air turbine starter, which is used to initiate the rotation of the turbine engine. The air turbine starter (ATS) includes a turbine wheel and an output shaft. The starter valve selectively couples the turbine wheel to a high-pressure fluid source such as, but not limited to, air from an auxiliary power unit, bleed air from the compressor stage of an operating gas turbine engine, and other sources. Once the starter valve is opened, the high-pressure air impinges on the turbine wheel, causing the output shaft to rotate. The output shaft, in turn, causes the turbine engine to rotate. Once the turbine engine achieves a desired rotational speed, jet fuel can be ignited within the turbine to start the turbine engine.

In the use of butterfly valves with anti-icing systems, the valves are commonly known as "anti-icing valves". The anti-icing valve is used to divert a high-temperature fluid source to one or more portions of the aircraft on which ice can form. For example, it is common for anti-icing valves to selectively feed bleed air from the compressor stage of the operating gas turbine engine into an air upstream of the engine's air intake system. The feeding of the high temperature bleed air into and onto various components of the intake system has proven effective at removing ice from these systems.

Thus, it is common to regulate the flow of high pressure, high temperature air (e.g., air from APU and/or turbine engine bleed air) using butterfly valves. However, it has been determined by the present disclosure that the high temperature and pressure of the air can expose the butterfly valves to operating temperatures, pressure, abrasive action, and other conditions sufficient to cause premature valve failure. For example, the high temperature can be sufficient to warp the valve body from a predetermined shape.

In some instances, the warp in the valve body can be sufficient to cause the butterfly flap to rub or scrap against the inside of the valve body, which can cause pits and channels inside the valve body such that the valve leaks even in a closed position. In other instances, the warp in the valve body can be sufficient to prevent the butterfly flap from moving between its open and closed positions.

Accordingly, it has been determined by the present disclosure that there is a continuing need for butterfly valves that overcome, mitigate, and/or alleviate one or more of the deleterious effects of prior art butterfly valves.

BRIEF SUMMARY OF THE INVENTION

A butterfly valve having a sleeve insert in the area of the butterfly plate is provided.

A butterfly valve having a valve body, a butterfly shaft, a butterfly plate, and a sleeve insert is provided. The valve body is made of a first material and the sleeve insert is made of a second material. The butterfly shaft is in the valve body for rotation about a first axis. The butterfly plate is in the valve body and secured to the butterfly shaft so that rotation of the butterfly shaft causes the butterfly plate to rotate about a second axis through a travel path between a closed position and an open position. The sleeve insert is in the valve body at least in a region of the travel path between the valve body and the butterfly plate.

A butterfly valve having an aluminum valve body, a stainless steel sleeve insert, an insulation member, and a butterfly plate is also provided. The aluminum valve body has a predefined region and the stainless steel sleeve insert is in the predefined region. The insulation member is between the valve body and the sleeve insert. The butterfly plate is in the stainless steel sleeve insert and is moveable between a closed position and an open position.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 1 is a partial sectional view of a butterfly valve according to an exemplary embodiment of the present disclosure;

FIG. 2 is a partial sectional view of a valve body and structural insert of FIG. 1; and FIG. 3 is a perspective view of FIG. 2.

DETAILED DESCRIPTION OF THE INVENTION

Referring to the drawings and in particular to FIG. 1, an exemplary embodiment of a butterfly valve according to the present disclosure is generally illustrated by reference number 10. Valve 10 selectively controls the flow of high-pressure air, such as bleed air, to various aircraft systems such as, but not limited to, starting systems, anti-icing systems, electrical generation systems, environmental control systems, and others.

Advantageously, valve 10 is configured to withstand the temperatures, pressures, abrasive action, and other conditions to which the valve is exposed due to bleed air.

As shown in FIG. 1, valve 10 includes a valve body 12, a butterfly plate 14, a butterfly shaft 16, and an actuator 18. Shaft 16 is disposed in valve body 12 so that the shaft is rotatable by actuator 18 or other rotation devices about a first axis of rotation 20. Butterfly plate 14 is connected to shaft 16 so that rotation of the shaft about first axis 20 causes the plate to rotate about a second axis of rotation 22. In this manner, actuator 18 is configured to move butterfly plate 14 between a closed position and an open position (illustrated in phantom) as shown in FIG. 1.

Valve body 12 has a first side 24 that can be placed in fluid communication with a pressurized fluid 26, such as bleed air, and a second side 28 that can be placed in fluid communication with an aircraft system 30. In this manner, the pressurized fluid 26 enters valve body 12 is not communicated to aircraft system 30 when butterfly plate 14 is in the closed position, but is communicated to aircraft system 30 when butterfly plate 14 is in the open position. Pressurized fluid 26 can be provided from any source such as, but not limited to, an auxiliary power unit (APU), bleed air from the compressor stage of an operating gas turbine engine, a hydraulic accumulator, a ground start cart, another aircraft, and any combinations thereof.

Valve 10 is configured to operate with pressurized fluid 26 having an operating pressure of about 75 pounds per square inch gauge (psig) at a temperature of about 500 degrees Fahrenheit (F.). Moreover, valve 10 is configured to operate with pressurized fluid 26 having a maximum proof pressure of about 150 psig at about 550 degrees F. without deformation.

Valve 10 advantageously includes a flow tube sleeve insert 32 disposed in valve body 12. Sleeve insert 32 is disposed in valve body 12 at least in a travel path 34 of butterfly plate 14. In some embodiments, sleeve insert 32 is disposed along an entirety of valve body 12.

Valve body 12 is formed from a lightweight metal or alloy such as anodized aluminum T6 as is common with prior art valve bodies. While not wishing to be bound by any particular theory, it has been determined by the present disclosure that formation of valve body 12 of aluminum can, in the absence of sleeve insert 32 of the present disclosure, cause butterfly plate 14 to undesirably stick in an open and/or closed position.

For example, it is believed that butterfly plate 14 can cause gouging of flow body 12 near the butterfly plate 14 due to the duty cycle being exceeded and prolonged exposure to the high temperatures and pressures of fluid 26. It is believed that the pressure and temperature of fluid 26 cause aluminum valve body 12 to soften, allowing an anodizing layer to flake off and/or allowing the valve body to deform so that the aluminum valve body is gouged by butterfly plate 14 when the plate moves between the open and closed positions.

In one non-limiting embodiment, sleeve insert 32 is formed of a material having sufficient hardness to prevent gouging of the valve body 12 by the butterfly plate 14 during operation between the open and closed positions. Moreover, sleeve insert 32 is formed of a material having sufficient temperature resistance to distortion due to repeated exposure to fluid 26. For example, it is contemplated by the present disclosure for sleeve insert 32 to be formed of stainless steel, titanium, low alloy steel, and alloys thereof.

It has also been determined by the present disclosure that valve 10 having aluminum valve body 12 and stainless steel sleeve insert 32 provides the valve with a weight of about 2.844 pounds. In contrast, prior art valves of similar size formed entirely of aluminum had a weight of about 2.80 pounds, while prior art valves of similar size formed entirely of stainless steel had a weight of about 3.40 pounds. Further, prior art valves of similar size formed entirely of titanium had a weight lower that the 2.80 pounds of aluminum valve bodies, but cost three to four times more than the aluminum valve bodies.

Advantageously, valve 10 of the present disclosure having sleeve insert 32 provides the benefits of stronger materials without the weight or cost penalties of prior art valves.

Sleeve insert 32 may be held in place inside valve body 12 by any means known to one of ordinary skill in the art that permits tolerance variations due to differences in coefficient of thermal expansion including, but not limited to, press fit, fastened, staked, bonded, welded, combinations thereof, and the like.

In a preferred embodiment, sleeve insert 32 has an outer diameter 36 that is smaller than an inner diameter 38 of valve body 12 so that a gap 44 is defined between the sleeve insert and the valve body. In one referred embodiment, gap 44 is sufficient so that sleeve insert 32 floats inside valve body 12. Sleeve insert 32 includes a pair of openings 40 through which butterfly shaft 16 extends. In this manner, sleeve insert 32 is held in place in valve body 12 by butterfly shaft 16. In some embodiments, valve 10 can include a sealing member 42, such as an o-ring, disposed between valve body 12 and sleeve insert 32 to mitigate the flow of pressurized fluid 26 therebetween.

As discussed above, valve body 12 and sleeve insert 32 are formed of dissimilar metals. In order to address corrosion resulting from these dissimilar metals, valve 10 further includes an insulation member 46 between valve body 32 and sleeve insert 32 to mitigate this corrosion. It is contemplated by the present disclosure for insulation member 46 to include any device known to those of ordinary skill in the art including, but not limited to, a foil, a plating, a sealant, and the like. Insulation member 46 can be a separate member or can be disposed on an inner side valve body 12, an outer side of sleeve insert 32, or both.

Accordingly, valve 10 finds use in aircraft starting systems, anti-icing systems, electrical generation systems, auxiliary power units (APU's), environmental control systems, and others. More particularly, valve 10 finds use as a turbine engine starter valve, as an anti-icing valve, and others.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A butterfly valve comprising:
a valve body made of a first material;
a butterfly shaft in said valve body for rotation about a first axis;
a butterfly plate in said valve body and secured to said butterfly shaft so that rotation of said butterfly shaft causes said butterfly plate to rotate about a second axis through a travel path between a closed position and an open position;
a sleeve insert made of a second material harder than said first material, said sleeve insert within said valve body at least in a region of said travel path between said valve body and said butterfly plate, said sleeve insert comprises a pair of openings through which said butterfly shaft extends, said sleeve insert at least partially held in place in said valve body by said butterfly shaft; and
an insulation member between said valve body and said sleeve insert, said insulation member operable to mitigate corrosion between said valve body and said sleeve insert.

2. The butterfly valve as in claim 1, wherein said first material comprises aluminum.

3. The butterfly valve as in claim 2, wherein said second material comprises a material selected from the group consisting of stainless steel, titanium, low alloy steel, and alloys thereof.

4. The butterfly valve as in claim 1, further comprising an actuator configured to rotate said butterfly shaft about said first axis of rotation.

5. The butterfly valve as in claim 1, wherein said valve body comprises a first side configured to be placed in fluid communication with a pressurized fluid and a second side configured to be placed in fluid communication with an aircraft system.

6. The butterfly valve as in claim 1, wherein the pressurized fluid comprises fluid from an auxiliary power unit or bleed air from a compressor stage of an operating gas turbine engine.

7. The butterfly valve as in claim 1, wherein said sleeve insert is secured in said valve body in a manner that permits tolerance variations due to differences in coefficient of thermal expansion between said first and second materials.

8. The butterfly valve as in claim 1, wherein said sleeve insert is secured in said valve body by means selected from the group consisting of a press fit, a fastener, a stake, a bond, a weld, and any combinations thereof.

9. The butterfly valve as in claim 1, wherein said sleeve insert has an outer diameter that is smaller than an inner diameter of said valve body so that a gap is defined between said sleeve insert and said valve body.

10. The butterfly valve as in claim 9, further comprising a sealing member between said valve body and said sleeve insert.

11. The butterfly valve as in claim 1, wherein said insulation member is selected from the group consisting of a foil, a plating, a sealant, and any combinations thereof.

12. The butterfly valve as in claim 1, wherein said insulation member is a separate member or is disposed on an inner side said valve body, or is disposed on an outer side of said sleeve insert.

13. The butterfly valve as in claim 10, wherein the butterfly valve finds use as a turbine engine starter valve or an anti-icing valve.

14. The butterfly valve as in claim 1, wherein said sleeve insert comprises a tubular member.

15. The butterfly valve as in claim 1, wherein said sleeve insert defines an axial length which extends over said entire travel path.

16. The butterfly valve as in claim 1, wherein said first axis is transverse to said second axis.

17. The butterfly valve as in claim 16, wherein said first axis defines an acute angle relative to said second axis.

18. The butterfly valve as in claim 1, wherein said first axis crosses said second axis at an intersection defined along a third axis, the third axis defined along a fluid communication path through said valve body through which a pressurized fluid may flow.

* * * * *